Jan. 3, 1956　　　　G. W. SODERMAN　　　　2,729,035
MICROMETER SLIDE ATTACHMENT FOR GRINDING MACHINES
Filed Nov. 28, 1952　　　　　　　　　　2 Sheets-Sheet 1

INVENTOR
G. W. SODERMAN
BY
*W. P. Parnell*
ATTORNEY

Jan. 3, 1956  G. W. SODERMAN  2,729,035
MICROMETER SLIDE ATTACHMENT FOR GRINDING MACHINES
Filed Nov. 28, 1952  2 Sheets-Sheet 2

INVENTOR
G. W. SODERMAN
BY
ATTORNEY

United States Patent Office 2,729,035
Patented Jan. 3, 1956

2,729,035

MICROMETER SLIDE ATTACHMENT FOR GRINDING MACHINES

George W. Soderman, West Englewood, N. J., assignor to Western Electric Company, Incorporated, New York, N. Y., a corporation of New York Application November 28, 1952, Serial No. 323,003

2 Claims. (Cl. 51—102)

This invention relates to work attachments for grinders and more particularly to micrometer gages for use in making articles, such as tools, with profile grinders.

Numerous tools such as dies for punch presses used in blanking or forming parts from materials must be constructed with article forming portions having contours with predetermined close limits of the required dimensions. However, the more it is possible to approach the required dimensions in making tools or dies, the more accurate will be the articles produced thereby. If it were possible to grind or otherwise cut a tool exactly to the required dimension, the article produced thereby should be perfect.

The object of the present invention is an attachment, for a grinder, which is simple in structure readily positioned for different types of grinding operations and highly accurate in controlling the depth of the cut by the grinder.

With this and other objects in view the invention comprises a gaging element, for use in combination with a grinder having a work supporting table and a grinding wheel rotatable about a given axis, the gaging element being mounted for movement relative to the table and axis for initial positioning by the article with a portion of the article to be ground engaging the grinding wheel, while an opposing surface of the article engages the element, after which the gage element may be moved a measured distance from the initial position determining the depth of cut for the grinding wheel into the portion of the work.

More specifically, the invention includes parallel gaging elements disposed transversely of the work supporting table of the grinder and connected to carriages, movable with their respective supports into the initial positions after which the supports may be secured against movement followed by movement of a dial relative to a pointer driving a moving means for each carriage to move either one of the gaging elements measured distances from the initial positioning of the work.

Other objects and advantages will be apparent from the following detailed description when considered in conjunction with the accompanying drawings, wherein.

Figure 1:
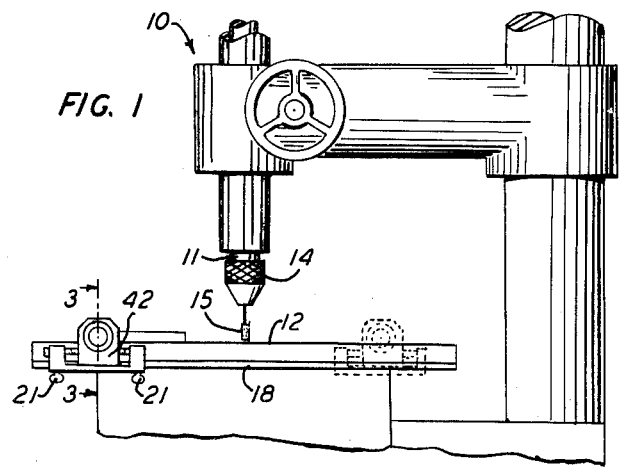
Fig. 1 is a side elevational view of a profile grinder selected to illustrate the invention.
Figure 2:
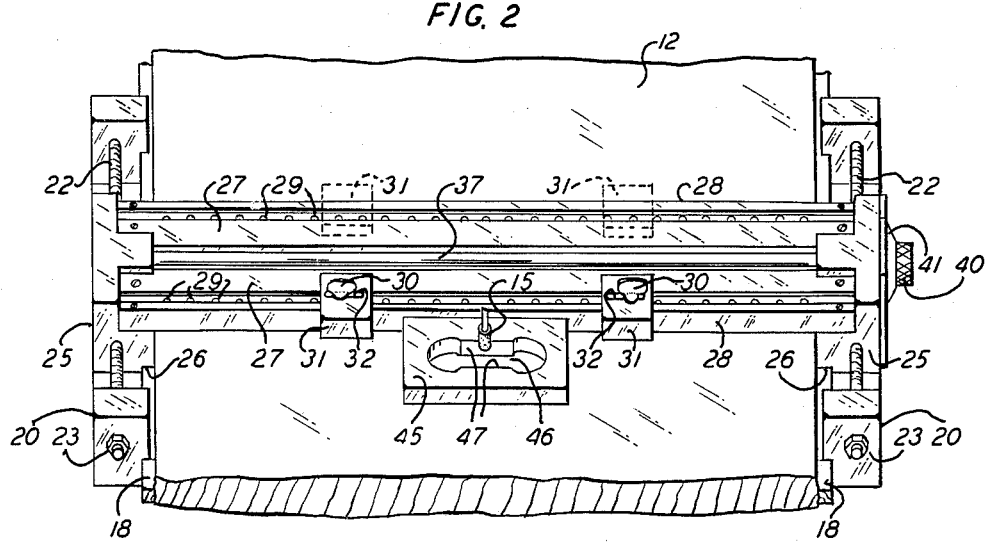
Fig. 2 is an isometric view of a portion of the work supporting table with the attachment mounted thereon; and, Fig. 3 is an enlarged fragmentary sectional view taken along the line 3—3 of Fig. 1.

Referring now to the drawings, attention is first directed to Fig. 1 which illustrates a profiling machine 10, having a rotatable spindle 11 movable vertically relative to a work supporting table 12 and carrying a chuck 14 to removably receive and hold a grinding wheel 15.

Parallel tracks 18 are mounted at selected positions on the sides of the table 12 to be received in recesses 19 of substantially U-shaped supports 20 which carry locking screws 21 adapted to secure the supports in any selected position on their tracks relative to the table. The supports 20 have aligned apertures in the vertically extending leg portions thereof to receive threaded shafts 22, secured at their ends against movement by suitable elements 23. Carriages 25 of suitable contours have notches 26 in their lower ends to ride on the tracks 18 in their respective supports 20.

Parallel guiding elements 27 have their ends mounted in recessed portions of their respective carriages 25 spaced from each other and provided with work engaging surfaces 28. A series of threaded apertures 29 is provided in each of the gaging elements 27 to receive screws 30 serving to secure their respective stops 31 in selected positions on either gage element to limit the path of movement of an article being ground. Through the combination of the threaded apertures 29 and elongate apertures 32 in the stops 31, these stops may be located at any adjusted position relative to each other and the axis of the grinding wheel 15.

Figure 3:
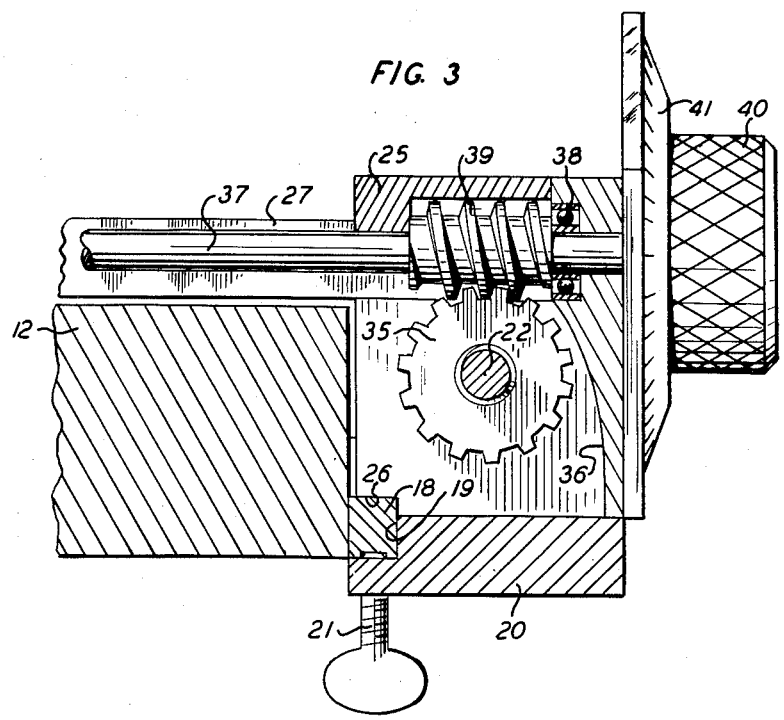

A worm gear 35, as shown in Fig. 3, is mounted on each of the shafts 22 and threadedly connected thereto, whereby rotation of the worm gears will cause them to move longitudinally of their threaded shafts in either direction depending on their direction of rotation. The worm gears are free to rotate in like cutaway portions 36 of their respective carriages but are held against axial movement relative to the carriage to assure positioning of the gaging elements known measured distances from the grinding wheel 15.

A shaft 37 suitably journaled in bearings 38, only one of which is shown, in the carriages 25 between the gaging elements 27, has like worms 39 fixedly mounted thereon and positioned for interengagement with their respective worm gears 35 to impart like rotary motions to the worm gears during rotation of the shaft 37 in either direction. A micrometer dial 40 having graduations 41 representing one, ten thousandth (.0001) of an inch is fixedly mounted on the end of the shaft 37 and movable relative to a pointer 42.

Considering now the operation of the fixture in combination with a grinder such as the profile grinder 10, let it be assumed that a die 45 is to be formed with a die cavity 46 which is elongate with rounded ends. The rounded ends may be formed by drilling and reaming after which the major part of the central portion of the material may be removed by any suitable means. During the forming of the cavity thus far the dimensions are taken from the side faces of the die which are machined accurately. The die is now ready for the finishing operations and is placed on the table 12 with the partially completed cavity in general alignment with the grinding wheel and, with the grinding wheel idle, it may be lowered into the cavity after which the attachment or fixture may be moved with the die relative to the table on the tracks 18 until one portion 47 to be ground engages the grinding wheel and until the surface 28, of the selected gaging element, engages the opposing surface of the die, after which the supports 20 are secured against movement through the aid of the screws 21. The operator then determines the necessary movement of the die to bring about the grinding of a predetermined portion thereof after which the stops 31 are set accordingly. When this has been accomplished, the operator adjusts the micrometer wheel 40 the distance of one or more divisions thereon, depending on the depth of the cut to be made in the portion of the die. Through this adjustment the shaft 37 will be rotated, rotating the worms 39 to rotate the worm gears 35 relative to the shafts 22, causing like movements of the carriages 25 with the gaging elements 27 away from the initial position of the work or die. In the present illustration, the portion 47 of the die may be moved into engagement with the grinding wheel 15 which, at this time, will be rotating in the die cavity. Reciprocable movement may be imparted to the die until the opposing outer surface of the die engages the surface 28 of the gaging element 27, and the grinding wheel ceases to remove any material from the die. It is known, therefore, that if the micrometer dial 40 is set at the first indication beyond the zero (0) indication, the cut made by the sharpening of the die is only one, ten thousandth (.0001) of an inch.

Other types of articles or tools may be ground through the use of either of the gaging elements 27, the movements of the articles being determined and limited by setting the stops 31 and the depth of cut in each instance being accurately measured by setting the micrometer dial 40 relative to the pointer 42.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In combination with a profile grinder having a work supporting table and a grinding wheel rotatable about a given axis and reciprocable axially into and out of an article to be ground, a gaging element mounted for movement into selective positions relative to the table and axis to be initially positioned by an article with an inner surface to be ground engaging the grinding wheel while an opposing outer surface of the article engages the element, a measuring wheel having radial graduations representing fractions of an inch positioned circumferentially from a zero position disposed adjacent a fixed pointer when the gaging element is disposed in the initial position, and means responsive to the measuring wheel to move the gaging element a measured distance away from said initial position whereby the article may be moved to cause grinding of the inner surface until said opposing outer surface engages the element.

2. In combination with a profile grinder having a work supporting table and a grinding wheel rotatable about a given axis and reciprocable axially into and out of an article to be ground, a gaging element mounted for movement into selective positions relative to the table and axis to be initially positioned by an article with an inner surface to be ground engaging the grinding wheel while an opposing outer surface of the article engages the element, a measuring wheel having radial graduations representing fractions of an inch positioned circumferentially from a zero position disposed adjacent a fixed pointer when the gaging element is disposed in the initial position, means responsive to the measuring wheel to move the gaging element a measured distance away from said initial position whereby the article may be moved to cause grinding of the inner surface until said opposing outer surface engages the element, and stops mounted at selectively variable positions on the gaging element relative to the grinding wheel depending on the length of the inner surface to be ground to limit movement of the article until said opposing surface engages the element.

References Cited in the file of this patent

UNITED STATES PATENTS

| | | |
|---|---|---|
| 271,018 | Barnhart | Jan. 23, 1883 |
| 396,666 | Prince | Jan. 22, 1889 |
| 859,138 | Spencer et al. | July 2, 1907 |
| 1,586,614 | Doucette | June 1, 1926 |
| 1,948,859 | Jones | Feb. 27, 1934 |
| 2,188,595 | Hedgpeth | Jan. 30, 1940 |
| 2,437,986 | Woodbury | Mar. 16, 1948 |
| 2,562,246 | Van Dam et al. | July 31, 1951 |
| 2,579,680 | Leighton | Dec. 25, 1951 |